(12) United States Patent
Sung

(10) Patent No.: US 7,128,547 B2
(45) Date of Patent: *Oct. 31, 2006

(54) HIGH PRESSURE SPLIT DIE AND ASSOCIATED METHODS

(76) Inventor: Chien-Min Sung, No. 4, Lane 32, Chung-Cheng Road, Tansui, Taipei County (TW) 23911

( * ) Notice: Subject to any disclaimer, the term of this patent is extended or adjusted under 35 U.S.C. 154(b) by 66 days.

This patent is subject to a terminal disclaimer.

(21) Appl. No.: 10/757,715

(22) Filed: Jan. 13, 2004

(65) Prior Publication Data

US 2005/0153010 A1 Jul. 14, 2005

(51) Int. Cl.
*B28B 3/00* (2006.01)
(52) U.S. Cl. .................. 425/77; 425/330; 425/348 S; 425/355
(58) Field of Classification Search ............... 425/77, 425/330, 348 S, 352–355
See application file for complete search history.

(56) References Cited

U.S. PATENT DOCUMENTS

| | | | |
|---|---|---|---|
| 2,941,247 A | 6/1960 | Bundy | |
| 2,942,248 A | 6/1960 | Hall | |
| 2,947,610 A | 8/1960 | Hall et al. | |
| 3,030,661 A | 4/1962 | Strong | |
| 3,031,269 A | 4/1962 | Bovenkerk | |
| 3,075,245 A | 1/1963 | Bundy | |
| 3,084,388 A | 4/1963 | Ballhausen | |
| 3,088,169 A | 5/1963 | Wentorf, Jr. | |
| 3,137,896 A | 6/1964 | Daniels | |
| 3,159,876 A | 12/1964 | Hall | |
| 3,179,979 A | 4/1965 | Bundy et al. | |
| 3,271,502 A | 9/1966 | Wentorf, Jr. | |
| 3,332,747 A | 7/1967 | Bundy | |
| 3,365,751 A | 1/1968 | Ishizuka | |
| 3,488,153 A | 1/1970 | Bundy | |
| 3,492,695 A | 2/1970 | Kuratomi | |
| 3,529,324 A | 9/1970 | Kawai | |
| 3,695,797 A | 10/1972 | Bakul et al. | |
| 3,797,986 A * | 3/1974 | Onder ...................... 425/352 |
| 3,914,078 A | 10/1975 | Kendall | |
| 3,915,605 A * | 10/1975 | Vereschagin et al. ......... 425/77 |
| 4,302,168 A | 11/1981 | Khvostantsev | |
| 4,740,147 A | 4/1988 | Asari et al. | |
| 5,772,756 A | 6/1998 | Davies et al. | |

OTHER PUBLICATIONS

Hall, H. Tracy, "High Pressure-Temperature Apparatus," Conference on Metallurgy at High Pressure, Chapter 4, 1964.
Sung, Chien-Min, "A Century of Progress in the Development of Very High Pressure Apparatus for Scientific Research and Diamond Synthesis," High Temperatures—High Pressures, 1997, vol. 29, pp. 253-293.

* cited by examiner

*Primary Examiner*—Duane Smith
*Assistant Examiner*—Thu Khanh T. Nguyen
(74) *Attorney, Agent, or Firm*—Thorpe North & Western, LLP

(57) ABSTRACT

An improved high pressure apparatus can include a plurality of complementary die segments. The die segments can have inner surfaces which are shaped to form a die chamber upon assembly of the die segments. A pair of anvils can be oriented such that an anvil is at each end of the die chamber. To prevent the die segments from being forced apart during movement of the anvils, force members can be connected to the die segments. The force members can apply discrete forces to the die segments sufficient to retain the die segments in substantially fixed positions relative to each other during application of force by the pair of anvils. Using such a high pressure apparatus can achieve pressures as high as 10 GPa with improved useful die life and larger reaction volumes.

19 Claims, 5 Drawing Sheets

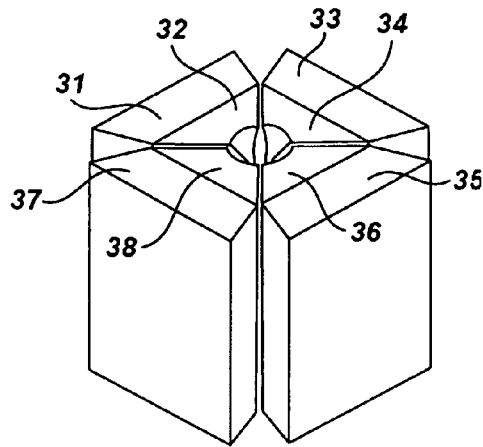 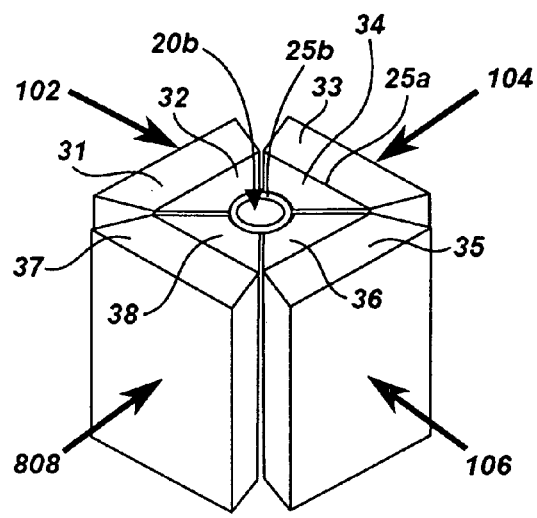
FIG. 3A          FIG. 3B
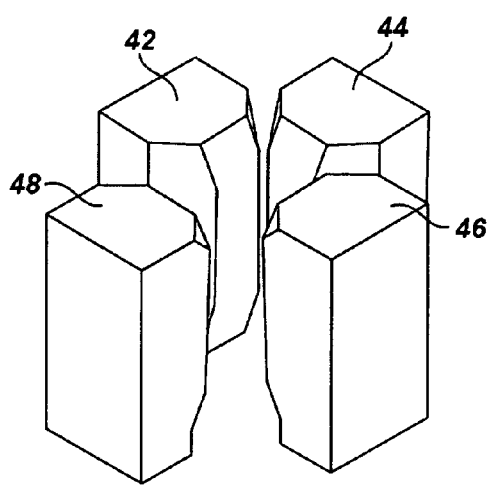 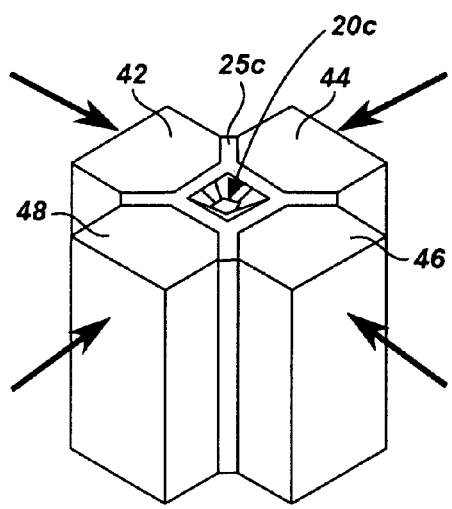
FIG. 4A          FIG. 4B

HIGH PRESSURE SPLIT DIE AND ASSOCIATED METHODS

FIELD OF THE INVENTION

The present invention relates generally to devices used in high pressure apparatuses capable of ultrahigh pressures above several GPa. Such high pressure devices can be used for high pressure high temperature (HPHT) growth of diamond and/or CBN and for a variety of other purposes. Accordingly, the present invention involves the fields of chemistry, metallurgy, materials science, and high pressure technology.

BACKGROUND OF THE INVENTION

Apparatuses for achieving high pressures have been known for over a half century. Typical ultrahigh pressure apparatuses include piston-cylinder presses, cubic presses, tetrahedral presses, belt presses, girdle presses, and the like. Several of these apparatuses are capable of achieving ultrahigh pressures from about 4 GPa to about 7 GPa.

High pressure apparatuses are commonly used to synthesize diamond and cubic boron nitride (cBN), commonly known as superabrasives. In 2003, high pressure apparatuses provided a worldwide production of diamond superabrasives of about 600 tons, while about 200 tons of cBN superabrasives were produced. Generally, raw materials can be formed into a high pressure assembly and then placed in the high pressure apparatus. Under high pressure and typically high temperature, the raw materials form the desired product. More specifically, graphite or diamond can be used as a raw material in diamond synthesis, while hexagonal boron nitride (hBN) can be used in cBN synthesis. The raw material can then be mixed or contacted with a catalyst material. Diamond synthesis catalysts such as Fe, Ni, Co, and alloys thereof are commonly used. Alkalis, alkali earth metals, or compounds of these materials can be used as the catalyst material in cBN synthesis. The raw materials and catalyst material can then be placed in a high pressure apparatus wherein the pressure is raised to an ultrahigh pressure, e.g., 5.5 GPa. An electrical current can then be used to heat the catalyst material sufficient to melt the catalyst material, e.g., typically about 1300° C. Under such conditions, the raw material can dissolve into the catalyst and then precipitate out in a crystalline form as either diamond or cBN.

Unfortunately, currently known high pressure apparatuses and associated methods have expensive parts with limited useful life and limited available reaction volumes. For example, a typical belt apparatus includes an inner die which is shaped like a belt or doughnut, and concentric metal rings formed around the inner die as support. Early examples of belt apparatuses are described in U.S. Pat. Nos. 2,947,610 and 3,031,269, which are incorporated herein by reference. A pair of anvils is shaped to fit in the ends of the die opening. As such, the primary compression source is the pair of anvils which essentially shorten the length of the reaction volume and thus increase the pressure on the material placed therein. Because of the use of a die, the belt-type apparatuses may achieve ultrahigh pressures in a relatively larger reaction volume than typical cubic and tetrahedral presses which utilize retractable anvils without a die. Unfortunately, the die is typically formed of cemented tungsten carbide and concentric metal rings which are extremely difficult to make and involve considerable expense. Specifically, the die and concentric rings are assembled with highly precise interference fittings. Further, it is difficult to sinter a large die with high uniformity which can often result in localized areas which are structurally weaker. In addition, the die material is typically metal carbide, e.g., tungsten carbide, which has a very high compressive strength but relatively low tensile strength. As a result, these expensive dies frequently crack and fail due to extremely high hoop tension that develops around the circumference of the die as the die and concentric rings expand during advance of the pair of anvils.

Other methods for achieving ultrahigh pressures include cubic and tetrahedral presses which utilize multiple advancing anvils to press a sample. One such device is described in U.S. Pat. No. 3,159,876, which is incorporated herein by reference. Cubic presses and belt-type apparatuses can be used for diamond synthesis. However, the reaction volumes of cubic presses are somewhat smaller than belt-type apparatuses.

Therefore, apparatuses and methods which overcome the above difficulties would be a significant advancement in the area of high pressure devices.

SUMMARY OF THE INVENTION

It has been recognized by the inventor that it would be advantageous to develop a device which allows for larger production throughput, decreased production costs, and has lengthened useful die lives.

In one aspect, the present invention resolves the problems set forth above by providing a high pressure apparatus including a plurality of complementary die segments. The die segments can have inner surfaces which are shaped to form a die chamber upon assembly of the die segments. A pair of anvils can be oriented such that an anvil is at each end of the die chamber. The anvils can be oriented to apply force to the die chamber substantially along the vertical axis of the chamber. Typically, the anvils are moved towards each other in order to shorten the die chamber. To prevent the die segments from being forced apart by the movement of the anvils, force members can be connected to the die segments. The force members can apply discrete forces to the die segments sufficient to retain the die segments in substantially fixed positions relative to each other during application of force by the pair of anvils.

In one detailed aspect of the present invention, the die chamber can have a wide variety of shapes. For example, the die chamber can have a central volume having a tapered region at each end of the central volume. The central volume can be cylindrical, rectangular, or the like. The tapered regions can be gradually tapered or can be flat tapers outward.

In another detailed aspect of the present invention, the die chamber can be formed from a number of die segments. In one aspect, the high pressure apparatus can include from two to ten complementary die segments. In two currently preferred embodiments the high pressure apparatus can have two to four complementary die segments.

In an additional aspect of the present invention, the die segments can have outer surfaces which are attached to support members. The support member can also be connected to the force members which help to retain the die segments together.

In yet another aspect of the present invention, the force members can be pairs of platen in a uniaxial press.

In still another aspect of the present invention, the support members can have an outer surface which is inwardly contoured to form a profile. The contoured surface of the support members can reduce tensile stress in the die segment.

In another aspect of the present invention, the support members and die segments can have contact surfaces which are contoured to control pressure distribution along the contact surfaces. Similarly, gasket materials can be contoured to correspond to the contours of the contact surfaces.

In accordance with the present invention, a method of applying high pressures to a high pressure assembly can include assembling a plurality of die segments to form a die chamber capable of holding the high pressure assembly. Force can then be applied to the high pressure assembly sufficient to provide high pressures within the reaction volume. During application of force, the die segments can be retained in substantially fixed positions relative to each other using a plurality of discrete forces. Typically, the discrete forces can intersect at a common point and act in a common plane substantially perpendicular to the chamber axis. Alternatively, the die segments can be retained or aligned using tie rods. Such tie rods can be connected to corresponding support members.

The methods of the present invention can provide ultrahigh pressures in the reaction volume. In one detailed aspect of the present invention, ultrahigh pressures from about 2 GPa to about 6 GPa can be maintained for a predetermined time. Typically, pressures can be maintained for several seconds to over 24 hours.

There has thus been outlined, rather broadly, various features of the invention so that the detailed description thereof that follows may be better understood, and so that the present contribution to the art may be better appreciated. Other features of the present invention will become more clear from the following detailed description of the invention, taken with the accompanying claims, or may be learned by the practice of the invention.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 3A is a perspective view of four die segments and corresponding support members in accordance with an embodiment of the present invention;

FIG. 3B is a perspective view of the die segments of FIG. 3A assembled to form a die chamber;

FIG. 4A is a perspective view of four die segments in accordance with an embodiment of the present invention;

FIG. 4B is a perspective view of the die segments of FIG. 4A assembled to form a die chamber;

DETAILED DESCRIPTION

Figure 1:
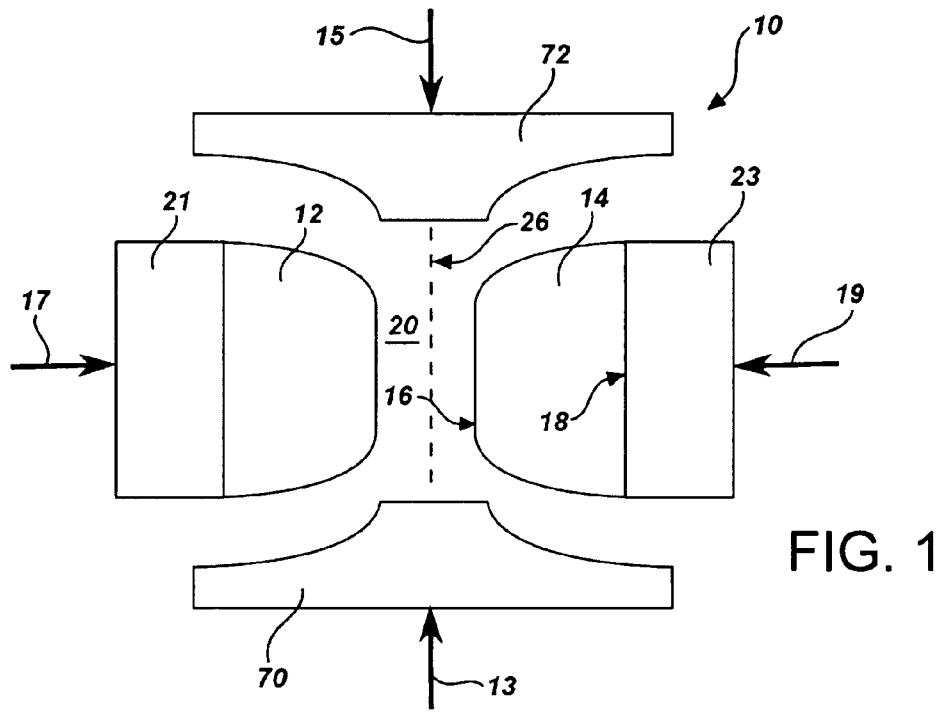
FIG. 1 is a cross-sectional view of a high pressure apparatus in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features, process steps, and materials illustrated herein, and additional applications of the principles of the inventions as illustrated herein, which would occur to one skilled in the relevant art and having possession of this disclosure, are to be considered within the scope of the invention. It should also be understood that terminology employed herein is used for the purpose of describing particular embodiments only and is not intended to be limiting.

A. Definitions

In describing and claiming the present invention, the following terminology will be used.

The singular forms "a," "an," and "the" include plural referents unless the context clearly dictates otherwise. Thus, for example, reference to "a die segment" includes reference to one or more of such materials, and reference to "an axial press" includes reference to one or more of such presses.

As used herein, "anvils" refers to any solid mass capable of at least partially entering the die chamber to increase pressure within the reaction volume. Those skilled in the art will recognize various shapes and materials used for such anvils. Typically, the anvils can have a frustoconical shape.

As used herein, "complementary" when used with respect to die segments, refers to parts which fit together to form a specified reaction volume configuration. The die segments "complement" each other by being shaped and configured to be held together under high pressures with minimal or no space between contact surfaces and to form an open die chamber. Frequently, complementary die segments can be configured to allow placement of a gasket or other material between contact surfaces to improve sealing of the reaction volume.

As used herein, "discrete force" refers to a force vector, which has an identifiable source and is associated with a single force vector, as opposed to a summation of somewhat random forces acting on a body, e.g., a gas or liquid surrounding a body.

As used herein, "reaction volume" refers to at least a portion of the die chamber in which conditions can be maintained at a high pressure sufficient for useful testing and/or growth of materials which are placed therein, e.g. usually the reaction volume can include a charge of raw material and catalyst for formation of superabrasive. The reaction volume can be formed within a high pressure assembly placed at least partially within the die chamber.

As used herein, "high pressure assembly" refers to an assembly of materials which are to be subjected to high pressure. Most often, these materials include the reaction volume at least partially surrounded by a pressure medium and/or gasket assembly. However, those skilled in the art will recognize that the high pressure assembly can be formed of almost any material which can then be subjected to high pressure for such purposes as chemical reactions, crystalline growth, high pressure property measurements, and the like. A wide variety of high pressure assemblies is known and can be used in the present invention. Such high pressure assemblies can also include inert gaskets, separators, or other materials which improve HPHT conditions.

As used herein, "high pressure" refers to pressures above about 1 MPa and preferably above about 200 MPa.

As used herein, "ultrahigh pressure" refers to pressures from about 1 GPa to about 15 GPa, and preferably from about 4 GPa to about 7 GPa.

As used herein, "alloy" refers to a solid or liquid mixture of a metal with a second material, said second material may be a non-metal, such as carbon, a metal, or an alloy which enhances or improves the properties of the metal.

As used herein, "seeds" refer to particles of either natural or synthetic diamond, super hard crystalline, or polycrystalline substance, or mixture of substances and include but are not limited to diamond, polycrystalline diamond (PCD), cubic boron nitride, SiC, and the like. Diamond seeds are used as a starting material for growing larger diamond crystals and help to avoid random nucleation and growth of diamond. Particularly, seeds can be used to produce useful superabrasive particles.

As used herein, "superabrasive" refers to particles of diamond or cBN, including sintered polycrystalline forms of diamond and cBN.

As used herein, "precursor" refers to an assembly of diamond seeds, particulate catalyst layer, and a carbon source layer. A precursor describes such an assembly prior to the diamond growth process, i.e. a "green body."

As used herein, "inclusion" refers to formation of carbon deposits instead of diamond at the interface between a growth surface of the diamond and the surrounding material. Inclusions are most often formed by the presence of substantial amounts of carbon at the growth surface of the diamond and/or inadequate control of temperature and pressure conditions during HPHT growth.

As used herein, "euhedral" means idiomorphic, or having an unaltered natural shape containing natural crystallographic faces.

As used herein, "substantially free of" or the like refers to the lack of an identified element or agent in a composition. Particularly, elements that are identified as being "substantially free of" are either completely absent from the composition, or are included only in amounts which are small enough so as to have no measurable effect on the composition.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited.

For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

B. The Invention

Reference will now be made to the drawings in which the various elements of the present invention will be given numeral designations and in which the invention will be discussed. It is to be understood that the following description is only exemplary of the principles of the present invention, and should not be viewed as narrowing the appended claims.

In accordance with the present invention, a high pressure apparatus can include a plurality of complementary die segments. The die segments of the present invention can be assembled to form a die chamber. The die chamber can be at least partially filled with a high pressure assembly containing materials to be subjected to high pressures. A pair of anvils can be oriented such that an anvil is at each end of the die chamber. The anvils can then be moved towards each other to compress the high pressure assembly and apply force thereto. Additionally, a plurality of force members can be operatively connected to the plurality of die segments to retain the die segments in substantially fixed positions relative to each other during application of force by the pair of anvils. One advantage to this configuration is that the die segments do not experience the same hoop tension around the die circumference as a standard single piece belt die.

Referring now to FIG. 1, a high pressure apparatus, shown generally at 10, can include a plurality of complementary die segments 12 and 14. Each die segment can have an inner surface 16 and an outer surface 18. The die segments can be configured to be assembled to form a die having a die chamber 20 capable of holding a high pressure assembly. The die chamber 20 can have a chamber axis 26 substantially along the center of the die chamber.

Figure 2A:
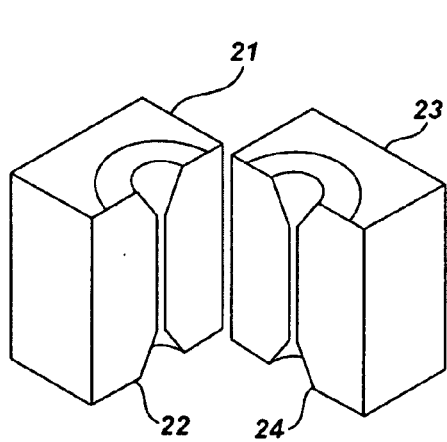
FIG. 2A is a perspective view of two die segments and corresponding support members in accordance with an embodiment of the present invention.

The die chamber 20 can be formed in a wide variety of shapes. FIG. 1 illustrates a die chamber having a cylindrical portion having ends which are tapered outward. The tapered portions are shown as tapering gradually to form a curved surface outward; however the tapered portions can be also be flat as shown in FIGS. 2A and 4A. Alternatively, the die chamber can also be a straight cylinder without a tapered portion. Of course, the die chamber can also have a shape which does not have a cylindrical portion, wherein the tapered portions at either end comprise the entire die chamber volume similar to a typical belt die. Typically, in this embodiment, the die chamber has a length which is from about 0.5 to about 10 times the minimum chamber diameter. Regardless of the die chamber configuration, the die chamber can have a length of from about 0.5 to about 15 times the minimum chamber diameter. In some embodiments, the die chamber can have a length of from about 1 to about 10 times the minimum chamber diameter. In an additional aspect of the present invention, the die chamber can have a reaction volume from about 1 $cm^3$ to about 1000 $cm^3$, and preferably from about 10 $cm^3$ to about 500 $cm^3$.

Other die chamber configurations can also be used and are considered within the scope of the present invention. In one aspect, the die chamber can have an interior surface which is substantially continuous such that when the die segments are assembled a single chamber extends through the assembled die segments. Preferably, the die segments can be shaped such that adjacent surfaces are flush and have substantially no space between them when assembled.

The inner surfaces of the plurality of die segments can be configured to form a die chamber having a predetermined cross-section. Specifically, the inner surfaces can be, but are not limited to, arcuate, flat, or contoured surfaces. For example, when assembled, arcuate inner surfaces can form a die chamber having a circular cross-section. Similarly, when assembled, flat inner surfaces can form a die chamber having triangle, square, pentagon, and the like cross-sections, depending on the number of die segments.

In accordance with the present invention, the number of complementary die segments can vary from two to any practical number. In one aspect, the high pressure apparatus of the present invention can include from two to ten complementary die segments. As the number of die segments increases, the relative size of each segment decreases. As a result, each die segment can be sintered having a higher degree of homogeneity and fewer localized structural weaknesses than a single die or larger die segments. However, a greater number of die segments can also increase complexity and maintenance costs of the apparatus, as described in more detail below in connection with increased numbers and complexity of support members and presses. Typically, the number of die segments can be from two to four. In one detailed aspect, the high pressure apparatus can include two complementary die segments. In another detailed aspect, the high pressure apparatus can include four complementary die segments.

The die segments can be formed of any hard material having a high compressive strength. Examples of suitable hard material for forming die segments of the present invention can include, but are not limited to, cemented tungsten carbide, alumina, silicon nitride, zirconium dioxide, hardened steel, super alloys, i.e. cobalt, nickel, and iron-based alloys, and the like. In a preferred embodiment, the die segments can be formed of cemented tungsten carbide. Those of ordinary skill in the art will recognize other materials that may be particularly suited to such high pressure devices.

Referring again to FIG. 1, the outer surface 18 can be configured to attach to respective support members 21 and 23. The outer surface can be any configuration such as flat or contoured; however typically the outer surface can be flat. The support members are optional in the high pressure apparatus of the present invention. However, it is often preferable to provide support members to protect and reinforce the more expensive die segments. Typically, each die segment can have a corresponding support member. Alternatively, two or more die segments can be attached to a single support member. The support members can be formed of any hard metal. Non-limiting examples of suitable hard metals include steel, hardened steel, metal carbides, ceramics, and alloys or composites thereof. Typically, the support members can be hardened steel. The die segments of FIG. 1 can be retained in substantially fixed positions relative to each other via discrete forces 17 and 19. Most often, the die segments and support members can be separated by a thin gasket material, e.g., pyrophillite or talc. The gasket material can provide improved sealing between surfaces and helps to avoid local pressure spikes due to direct contact of two hard materials.

FIGS. 2A through 7 illustrate a few potential configurations for segmented dies of the present invention. FIG. 2A shows a set of two complementary die segments 22 and 24, each engaged with a separate support member 21 and 23, respectively. The die segments can be assembled as shown in FIG. 2B to form die chamber 20a. The die chamber shown in FIG. 2B has a cylindrical portion and flat tapered portions at each end of the cylindrical portion. Forces 27 and 29 can be applied to the support members to retain the die segments together. An optional gasket 25 can also be included between contacting surfaces of the die segments and support members. The gasket can provide a seal between surfaces, as well as to electrically and/or thermally insulate. Typically, the gasket can be formed of known materials such as, but not limited to, talc, pyrophillite, and the like. Additional materials such as quartz and zirconia can be added to adjust various mechanical and/or thermal properties of the gasket.

FIG. 3A shows a set of four complementary die segments 32, 34, 36, and 38, each engaged with a separate support member 31, 33, 35, and 37, respectively. The die segments can be assembled as shown in FIG. 3B to form die chamber 20b. The die chamber shown in FIG. 3B has a cylindrical portion and flat tapered portions at each end of the cylindrical portion. Forces can be applied to each of the four support members to retain the die segments together. An optional gasket 25a can also be included between contacting surfaces of the die segments and support members. Additionally, optional gasket 25b can be placed in the die chamber, as is well known in the art.

FIG. 4A shows a set of four complementary die segments 42, 44, 46, and 48 having no attached support members. As such, in some aspects of the present invention, the die segment may be used without a support member, or the die segment and support member can be a single integral piece. The die segments can be assembled as shown in FIG. 4B to form die chamber 20c. The die chamber shown in FIG. 4B has a rectangular volume and flat tapered portions at each end of the rectangular volume. Forces can be applied to each of the four die segments to bring them together, and retain them in place when the anvils are used to apply pressure along the chamber axis of the die chamber. An optional gasket 25c can also be included between contacting surfaces and between surfaces of the die chamber and the high pressure assembly.

Figure 5A:
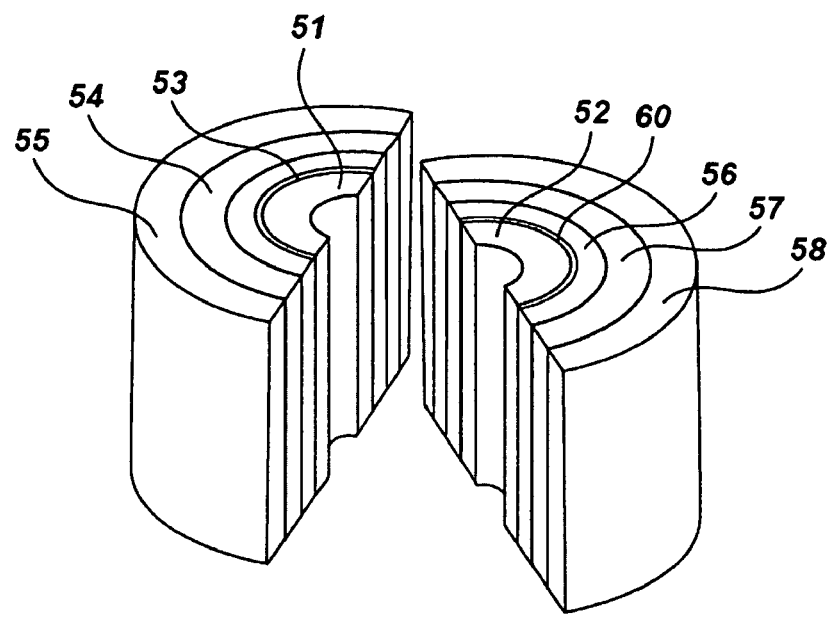
FIG. 5A is a perspective view of two die segments and corresponding support members in accordance with another embodiment of the present invention.
Figure 5B:
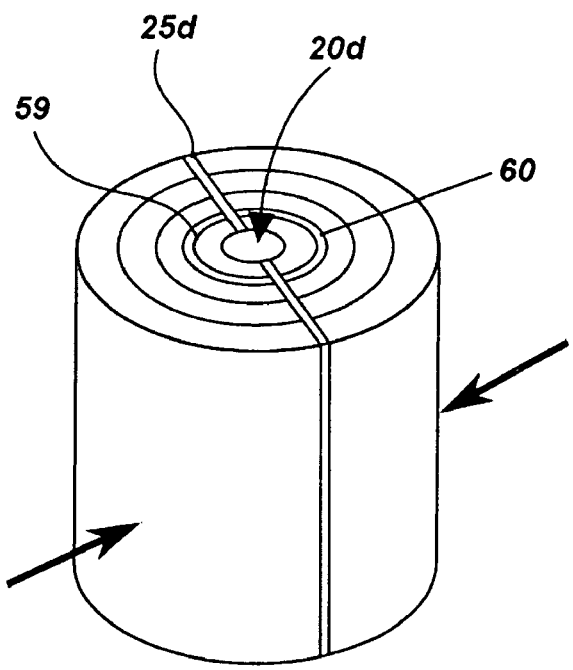
FIG. 5B is a perspective view of the die segments of FIG. 5A assembled to form a die chamber.

FIG. 5A shows a set of two complementary die segments 51 and 52, each surrounded by arcuate support members 53 through 58, respectively. The die segments can be assembled as shown in FIG. 5B to form die chamber 20d. The die chamber shown in FIG. 5B has a cylindrical portion and flat tapered portions at each end of the cylindrical portion having a smaller taper angle than that of FIG. 2A. Forces can be applied to each of the support members to retain the die segments together. An optional gasket 25d can also be included between contacting surfaces of the die segments and support members. Additionally, optional sleeves 59 and 60 can be placed between the die segments 51 and 52 and support members 53 and 56, respectively.

Similarly, a set of three complementary die segments can each be attached to a separate support member. The die segments can be assembled to form a die chamber. The die chamber can be shaped as in the configurations discussed herein. Forces can be applied to each of the three support members to retain the die segments together. An optional gasket can also be included between contacting surfaces of the die segments and support members. Additionally, an optional gasket can be placed in the die chamber, as is well known in the art.

Figure 6:
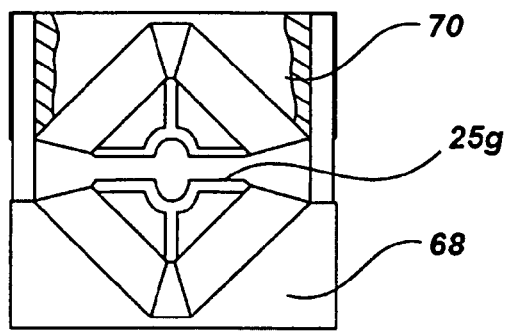
FIG. 6 is a top view of four die segments mounted on two support members in accordance with an embodiment of the present invention.
Figure 7:
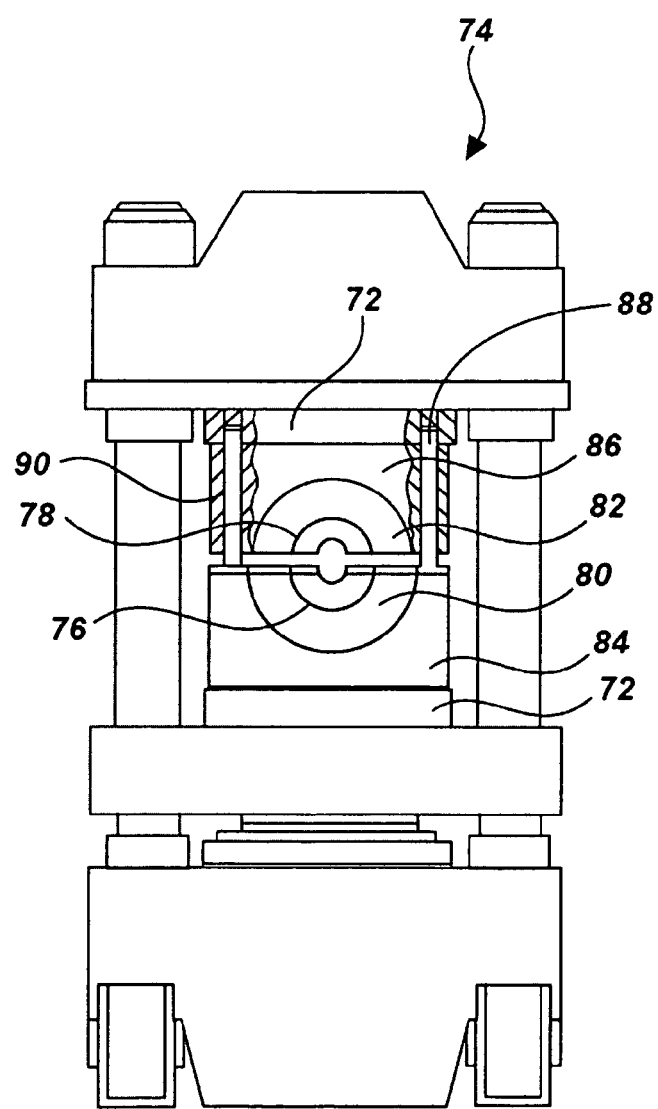
FIG. 7 is a side view of an axial press having two die segments and corresponding support members mounted therein.

FIG. 6 illustrates the four die segments and corresponding support members of FIGS. 3A and 3B attached to two secondary support members 68 and 70.

The above discussion has focused primarily on die segments wherein the die segments are split along surfaces which are substantially parallel to the chamber axis along the center of the die chamber. However, in an additional aspect of the present invention, the die segments can be split in almost any configuration. For example, the die segments can be split along a plane which is perpendicular to the chamber axis. Die segments which split the die chamber perpendicular to the chamber axis can allow for increased die chamber lengths and thus increased high pressure reaction volumes. In addition, perpendicular splits can improve access to the reaction volume during assembly, cleaning of the device, or replacement of failed die segments. Further, the perpendicular split can also allow for convenient insertion of thermocouples for temperature monitoring. As mentioned above, partitioning of the split die also reduces die segment production costs by allowing for smaller sintering masses and reduced non-homogeneous sintering.

Referring again to FIG. 1, a pair of anvils 70 and 72 can be oriented such that an anvil is at each end of the die chamber 20. The anvils can be configured to apply pressing forces 13 and 15 substantially along the chamber axis through movement of the anvils towards one another to shorten the die volume. Most often, a high pressure assembly can be placed in the die chamber such that the reaction volume is subjected to high pressure during application of force from the anvils. High pressure assemblies can contain a material to be subjected to high pressure such as diamond seeds, graphite, catalysts, CBN seeds, hexagonal boron nitride, and the like. Typically, the high pressure assembly can include metal braze coatings, gasket materials, graphite heating tubes, resistors, and the like. Those skilled in the art will recognize additional high pressure assembly compositions and configurations which are useful for reaction and or experimentation at high pressures.

Anvils 70 and 72 are shown as masses having frustoconical portions which are shaped to fit into the ends of the die chamber 20. In connection with the present invention, suitable anvil shapes can also include, without limitation, frustopyramidal, piston, and the like. For example, frustopyramidal anvils can be useful for use with die chambers such as die chamber 20c shown in FIG. 4B.

As the anvils advance, the materials placed in the die chamber have a tendency to expand radially outward against the die segments. In order to prevent movement of the die segments outward, a plurality of force members can be operatively connected to the plurality of die segments. The force members can be configured to apply a plurality of discrete forces to the die segments, in some cases through the support members. The discrete forces should be sufficient to retain the plurality of die segments in substantially fixed positions relative to each other during application of force by the pair of anvils. Some minimal movement of die segments can be permissible; however significant movement can allow for excess material to be forced into spaces between die segments. More importantly, if the die segments are allowed to move significantly, then the pressure within the reaction volume is reduced. Typically, the anvils have a limited distance which they can enter the die chamber, as can be seen in FIG. 1. Thus, when the die segments are allowed to move, the maximum achievable pressure is significantly reduced.

In accordance with the present invention, the force members can be any device or mechanism capable of applying force sufficient to retain the die segments in substantially fixed positions. Several non-limiting examples of suitable force members include uniaxial presses, hydraulic pistons, and the like. Hydraulic pistons and rams similar to those used in tetrahedral and cubic presses can also be used in the high pressure apparatus of the present invention. Alternatively, the force members can include tie rods and hydraulic pistons similar to those used in a standard cubic press. In one specific embodiment shown in FIG. 7, the force members can be pairs of platen 72 in a uniaxial press 74. Die segments 76 and 78 are held in arcuate support members 80 and 82, respectively. Support members 80 and 82 are also held in additional support members 84 and 86, respectively. The die segments are shown in a separated position. In this position, the die segments and/or support members can be easily replaced or adjusted. Further, subsequent to application of high pressure retraction of the die segments to a separated position can make removal of the high pressure assembly easier than with standard belt dies. In one aspect, wherein four die segments are attached to four corresponding support members, two uniaxial presses can be used to retain the four die segments in substantially fixed positions. The segmented force and associated support members of the present invention can be advantageous in that removal of die segments and opening of the die chamber subsequent to application of high pressure is readily accomplished.

The die segments 76 and 78 can be assembled to form a die chamber by engaging the pair of platen 72 using the uniaxial press 74. As the die segments move towards one another, optional guide pins 88 and 90 can ensure that the die segments are correctly oriented and can help to prevent lateral sliding during application of high pressure.

Typically, the chamber axis of the die chamber 20 can be vertical as shown in FIG. 1. However, in some alternative embodiments of the present invention the chamber axis can be oriented horizontally prior to application of force by the anvils. Depending on the composition of the high pressure assembly, a horizontal orientation can help to reduce problems associated with differences in density and temperature gradients during diamond synthesis. For example, during synthesis of diamond, the catalyst is substantially molten such that lower density diamond (3.5 g/cm$^3$) tends to float on the more dense molten catalyst (density greater than 8 g/cm$^3$). Moreover, the molten catalyst may flow upward via convection, if the lower portion of the molten catalyst is at a higher temperature than an upper portion. Such flow of molten catalyst or diamond is not desirable, e.g, under the temperature gradient method of diamond synthesis, convection can increase diffusion of carbon solute sufficient to disturb the growth rate of the seeded diamond resulting in non-homogeneous crystal formation and defects. Thus, one aspect of the present invention can include orienting the chamber axis substantially perpendicular to gravity in order to eliminate or substantially reduce such effects.

Regardless of the force members used, the force members can be configured to apply discrete forces to the die segments, either directly or via corresponding support members. In one aspect of the present invention, the discrete forces can intersect at a common point and act in a common plane substantially perpendicular to the chamber axis. Typically, the common point is along the chamber axis in order to prevent sliding or offsetting of the die segments with respect to one another.

Figure 2B:
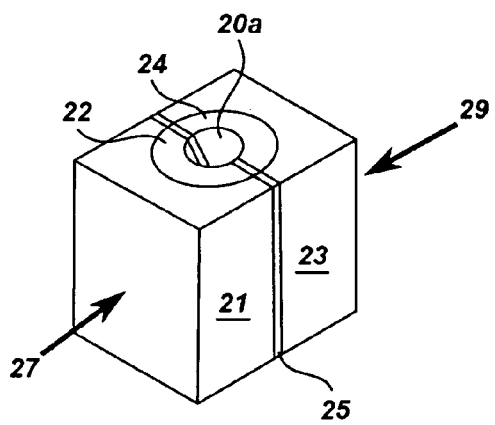
FIG. 2B is a perspective view of the die segments of FIG. 2A assembled to form a die chamber.

Referring to FIG. 2B, the two die segments 22 and 24 are retained together using discrete forces 27 and 29. Discrete forces 27 and 29 can be applied about 180° apart and about 90° to an interface plane defined by the interface of the die segments, corresponding generally to gasket 25. Similarly, FIG. 3B illustrates three die segments 62, 64, and 66 being retained together using discrete forces 27, 28, and 29, respectively. Discrete forces 92, 94, and 96 can act in a common plane about 120° apart and about 60° to the die segment interfaces. FIG. 3B illustrates four die segments 32, 34, 36, and 38 being retained by discrete forces 102, 104, 106, and 108, respectively. Discrete forces 102, 104, 106, and 108 can act in a common plane about 90° apart and about 45° to the die segment interfaces.

The advancing anvils act as a wedge to push the die segments apart. As a result, the amount of force required to retain the die segments together is typically greater than the force applied by the anvils. Therefore, the discrete forces combined can preferably be greater than the combined pressure from the anvils. In one detailed aspect of the present invention, as the pair of anvils advances, pressure is placed on the high pressure assembly such that force is applied radially outward against the die segments. As a result, the combined discrete forces required in order to retain the die segments can be greater than the pressure in the high pressure assembly. In addition, a typical die has an inner surface area larger than the anvils; consequently, the force (i.e. pressure times area) required to retain the die segments together is much larger than the force required to advance the anvils. Typically, anvils can provide a pressing force of from about 100 metric tons to about 10,000 metric tons, although forces outside this range can be used which are sufficient to achieve the desired pressures.

In accordance with the above principles, the high pressure apparatus of the present invention can produce high pressures within the die chamber. High pressures of over about 2 MPa can be easily achieved. In one aspect, the combined pressing forces are sufficient to provide ultrahigh pressures. In one detailed aspect, the ultrahigh pressures can be from about 1 GPa to about 10 GPa, and preferably from about 2 GPa to about 7 GPa, and most preferably from about 4 to about 6 GPa.

Figure 8:
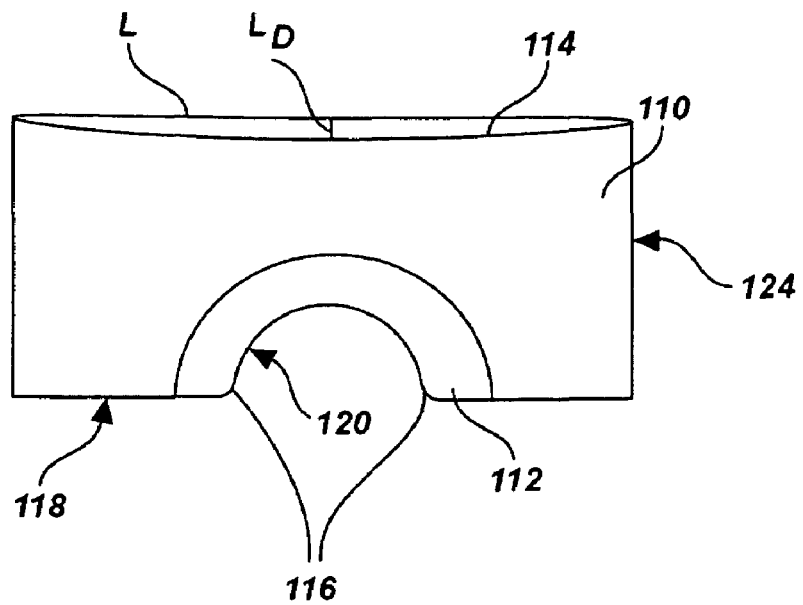
FIG. 8 is a top view of a contoured support member in accordance with an embodiment of the present invention.

In yet another detailed aspect of the present invention, the support members can be shaped to reduce tensile stress in a corresponding die segment. Application of force to support members such as those shown in FIG. 2B can cause premature failure of the die segments. Specifically, upon applying force to the support members 21 and 23 the die segments can experience a high tensile stress along a region of the inner surface of the die chamber. This tensile stress tends to cause cracking of the die segments, wherein cracks have a genesis at the inner surface which then grows toward the outer surface. FIG. 8 illustrates a support member 110 having a single arcuate die segment 112. The support member has an outer surface 114 which is opposite the die segments. The outer surface can be preferably inwardly contoured to form a profile configured to reduce tensile stress in the die segment. Optionally, a corresponding force member can be inwardly contoured to form a similar profile which decreases tensile stress in the die segment during application high pressure. The inward contour can be a slight inward concavity such as that shown in FIG. 8; however the inward contour can also be formed as a beveled surface having substantially flat surfaces which slope inward and meet at a maximum deviation, $L_D$. Other inward contours can also be used which decrease tensile stress at the inner surface of the die segment. The degree of inward contour is slight, and can be measured by the maximum deviation, $L_D$, from a straight line for a given outer surface length (L), i.e. $L_D/L \times 100$. In one aspect, the degree of contour can range from about 0.1% to about 2%; however, values outside this range can also be used. Specific ranges can be calculated based in the die support member size, materials used in the support member, and number of force members used in a particular design. The degree of contour can be sufficient to distribute applied load such that hoop tension at the die segments can be minimized. Those skilled in the art can make such calculations using their knowledge and readily available software. When the die support member 110 of FIG. 8 is subjected to a discrete force, the outer surface 114 tends to flatten with a large portion of stress being transferred from the more expensive die segment 112 to the support member.

Additionally, the die segment 112 can be shaped to reduce stress at corners 116. For example, the corners can be rounded (as shown in FIG. 8), tapered, or beveled. In this way, chipping or fracture of the die segment at the corner can be reduced. Of course, in some embodiments, any gasket material used between die segments having shaped corners 116 can be designed to match the contours of the contact surfaces 118. Preferably, the gasket material can be designed to eliminate or substantially fill any gaps between contact surfaces and/or the reaction assembly.

In yet another alternative embodiment of the present invention, the gasket material and corresponding contact surfaces of the die segments can be contoured to control pressure distribution through the assembled die segments and to reduce premature failure. Under ultrahigh pressures, the pressure gradient from the inner surfaces of the die segments to the exterior surfaces of the die segments or supporting members can be very dramatic, i.e. typically from 1 atm (101,325 Pa) to 5.5 GPa. Generally, it is preferable to reduce sharp spikes or drops in pressure which cause additional stress on the die segments and support members. For example, the contacting surface 118 can be flat with corresponding gasket materials having a constant thickness from the inner surface 120 of the die segment to the outer surface 122 of the support member. In this case, the majority of the pressure drop occurs near the outer surface resulting in a large stress on the support member 110 in outer regions near the contact surface.

Figure 9:
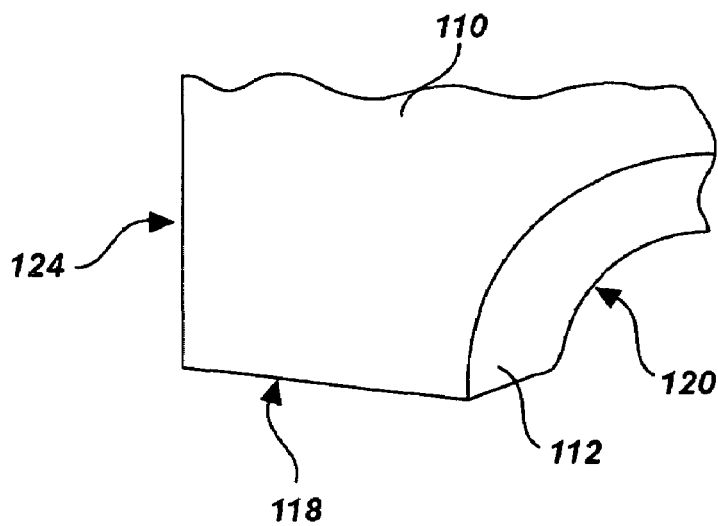
FIG. 9 is a top view of a portion of a support member and die segment having a contoured contact surface in accordance with an embodiment of the present invention.

In order to produce a more uniform pressure gradient, the contact surfaces 118 and corresponding gasket materials can be contoured. FIG. 9 illustrates one embodiment wherein the contact surface is contoured outwardly toward the inner surface 120 and the outer surface 124 with a peak at the interface between the support member 110 and the die segment 112. The contact surface can be contoured with other configurations such as gradual sloped surfaces or continuous taper, i.e. from the inner surface to the outer surface. For example, the gasket material can be shaped such that the gasket material is thicker toward the inner surface and tapers to a thinner thickness toward the outer surface. Alternatively, the gasket can have a thicker portion at the inner surface which then tapers to a narrower thickness near the joint between the support member and the die segment at which point the thickness can remain substantially the same or taper either inward or outward. In each of the above cases, the contact surfaces 118 can be contoured to match the gasket shape.

Further, in designing such contoured contact surfaces and corresponding gaskets a gradual decrease in pressure is desired. Typically, the slope of the pressure change is related to the thickness of the gasket. For example, a thicker gasket can allow for a larger drop in pressure than a thinner gasket. In addition, the difference between a thickest portion of the gasket and a thinnest portion of the gasket is typically very moderate and can be less than about 3:1. Thus, by adjusting the thickness of the gasket material and the associated contact surfaces, the pressure gradient can be controlled to reduce mechanical stress at certain portions of the die segment and/or support members.

The high pressure apparatus of the present invention can be used for a variety of high pressure applications. One suitable use of the apparatus of the present invention is high pressure growth of crystalline materials such as diamond and CBN. Alternatively, the behavior and properties of various materials can be studied at high pressures using the present invention.

For example, HPHT diamond synthesis typically involves formation of a diamond growth precursor. Typical precursors can include graphite powder and catalyst metal, i.e. a carbon solvent. Diamond seeds can also be included in order to control nucleation and growth of diamond. A particularly effective diamond growth precursor can have a controlled pattern of diamond seeds as described in U.S. Pat. No. 6,159,286, which is incorporated herein by reference. The diamond growth precursor can then be subjected to a temperature and pressure in which diamond is thermodynamically stable. As the temperature and pressure are increased sufficiently to diamond growth conditions, the catalyst metal facilitates formation of diamond from graphitic carbon. The growth conditions are maintained for a predetermined period of time to achieve a specific size of grown diamond. Typical growth conditions can vary somewhat, however the temperature can be from about 1000° C. to about 1600° C. and the pressure can be from about 2 to about 7 GPa, and preferably from about 4 to about 6 GPa. The appropriate temperature can depend on the catalyst material chosen. As a general guideline, the temperature can be from about 10° C. to about 200° C. above a melting point of the catalyst. Growth time can typically be from about five minutes to about two hours.

Thus, there is disclosed an improved high pressure apparatus and methods for applying high pressure and ultrahigh pressure to materials. The above description and examples are intended only to illustrate certain potential embodiments of this invention. It will be readily understood by those skilled in the art that the present invention is susceptible of a broad utility and applications. Many embodiments and adaptations of the present invention other than those herein described, as well as many variations, modifications and equivalent arrangements will be apparent from or reasonably suggested by the present invention and the foregoing description thereof without departing from the substance or scope of the present invention. Accordingly, while the present invention has been described herein in detail in relation to its preferred embodiment, it is to be understood that this disclosure is only illustrative and exemplary of the present invention and is made merely for purpose of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

What is claimed is:

1. A high pressure apparatus, comprising:
   a) a plurality of complementary die segments, each die segment having an inner surface and an outer surface, wherein the inner surfaces are configured to form a die chamber having a chamber axis upon assembly of the plurality of die segments;
   b) a pair of anvils oriented such that an anvil is at each end of the die chamber and configured to apply force substantially along the chamber axis; and
   c) a plurality of force members operatively connected to the plurality of die segments and configured to apply a plurality of discrete forces to the plurality of die segments sufficient to retain the plurality of die segments in substantially fixed positions relative to each other during application of force by the pair of anvils.

2. The apparatus of claim 1, wherein the inner surfaces of the plurality of die segments are arcuate and when assembled, form a die chamber having a central cylindrical volume and expanded open conical regions at each end of the cylindrical volume.

3. The apparatus of claim 2, comprising from two to ten complementary die segments.

4. The apparatus of claim 3, comprising two complementary die segments.

5. The apparatus of claim 3, comprising four complementary die segments.

6. The apparatus of claim 4, wherein the die chamber has a length of from about 1 to about 10 times the minimum diameter.

7. The apparatus of claim 1, wherein the inner surfaces of the plurality of die segments are substantially flat and when assembled, form a die chamber having a central rectangular volume and open regions tapered outwardly at each end of the rectangular volume.

8. The apparatus of claim 7, comprising four die segments.

9. The apparatus of claim 1, wherein the outer surfaces of the plurality of die segments are attached to a plurality of support members.

10. The apparatus of claim 9, wherein the force members are pairs of platen in a uniaxial press and wherein a pair of support members are operatively connected to respective pairs of platen in each of at least one uniaxial press.

11. The apparatus of claim 10, wherein two die segments are attached to each support member.

12. The apparatus of claim 9, wherein the die segments and support members are integrally formed of a single piece.

13. The apparatus of claim 9, wherein the plurality of support members have an outer surface opposite the die segments, wherein the outer surface is inwardly contoured to form a profile configured to reduce tensile stress in the die segment.

14. The apparatus of claim 9, wherein the die segments and support members have contoured contact surfaces which are configured to control pressure distribution along the contact surfaces and further comprises corresponding contoured gaskets configured for placement along the contact surfaces.

15. The apparatus of claim 1, wherein the discrete forces intersect at a common point and act in a common plane substantially perpendicular to the chamber axis.

16. The apparatus of claim 15, wherein the discrete forces are greater than the force applied by the pair of anvils.

17. The apparatus of claim 1, wherein the pair of anvils are frustoconical anvils.

18. The apparatus of claim 1, wherein the die chamber has a reaction volume from about 10 $cm^3$ to about 500 $cm^3$.

19. The apparatus of claim 1, wherein the chamber axis is oriented horizontally.

* * * * *